United States Patent
Xu et al.

(10) Patent No.: US 7,984,194 B2
(45) Date of Patent: Jul. 19, 2011

(54) DYNAMICALLY CONFIGURABLE SWITCH FOR DISTRIBUTED TEST LAB

(75) Inventors: Kaili Xu, Kirkland, WA (US); Kaushik Narayanan, Redmond, WA (US); Robert Martin, Redmond, WA (US); Binay Pathak, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 276 days.

(21) Appl. No.: 12/236,482

(22) Filed: Sep. 23, 2008

(65) Prior Publication Data

US 2010/0077079 A1 Mar. 25, 2010

(51) Int. Cl.
- G06F 15/16 (2006.01)
- H04M 1/24 (2006.01)
- H04L 12/50 (2006.01)
- G05B 11/32 (2006.01)

(52) U.S. Cl. ......... 709/250; 379/13; 370/357; 318/625
(58) Field of Classification Search .......... 709/250; 379/13; 370/357; 318/625
See application file for complete search history.

(56) References Cited

U.S. PATENT DOCUMENTS

| | | | |
|---|---|---|---|
| 5,189,665 A | | 2/1993 | Niehaus et al. |
| 5,742,587 A * | | 4/1998 | Zornig et al. ............... 370/235 |
| 6,084,876 A * | | 7/2000 | Kwok et al. ............... 370/379 |
| 6,320,993 B1 | | 11/2001 | Laor |
| 6,456,597 B1 * | | 9/2002 | Bare ............................ 370/252 |
| 6,557,070 B1 | | 4/2003 | Noel et al. |
| 6,597,692 B1 | | 7/2003 | Venkitakrishnan |
| 6,614,889 B2 | | 9/2003 | Perkins |
| 6,892,328 B2 | | 5/2005 | Klein et al. |
| 7,002,926 B1 * | | 2/2006 | Eneboe et al. ............... 370/255 |
| 7,113,489 B2 | | 9/2006 | Lindsey et al. |
| 7,130,501 B2 | | 10/2006 | Will et al. |
| 7,173,906 B2 | | 2/2007 | Ravi et al. |
| 2004/0199370 A1 * | | 10/2004 | Arama et al. ................. 703/20 |
| 2006/0161680 A1 * | | 7/2006 | Balsevich ..................... 709/245 |
| 2006/0195674 A1 * | | 8/2006 | Arndt et al. .................. 711/173 |

OTHER PUBLICATIONS

Bitting, Michael., "New Optical Switches Enable Automated Testing with True Flexibility", IEEE Systems Readiness Technology Conference, 2004, retrieved at <<http://ieeexplore.ieee.org/iel5/9814/30947/01436883.pdf>>, 2004, pp. 361-366.

(Continued)

*Primary Examiner* — Ranodhi N Serrao
(74) *Attorney, Agent, or Firm* — Lyon & Harr, LLP; Richard T. Lyon (57) ABSTRACT

A switch is provided which is dynamically configurable via a network port thereon. One switch is employed to establish point-to-point electrical connections between devices under test (DUTs) and host devices coupled to upstream ports and downstream ports on the switch respectively. Two switches coupled to a network are employed to facilitate a distributed test lab. DUTs are coupled to upstream ports on a first switch which, based on communication with a test controller over the network, establishes a logical connection between the upstream port coupled to a particular DUT and the network. Host devices are coupled to downstream ports on a second switch which, based on communication with the test controller over the network, establishes a logical connection between the downstream port coupled to a particular host device and the network. A logical connection is also established across the network between the particular DUT and host device.

13 Claims, 5 Drawing Sheets

OTHER PUBLICATIONS

"CDWG", "Belkin 4×4 USB Peripheral Switch", retrieved at <<http://www.cdwg.com/shop/products/default.aspx?EDC=446109>>, May 12, 2008, p. 1-1.

"BNet", "Software Manages Switches in Multi-User Test Labs", retrieved at <<http://findarticles.com/p/articles/mi_m0PIL/is_2008_March_18/ai_n24927043, May 9, 2008, pp. 1-6.

Xie, et al., "Proposal of a Novel MMI-Based N×N Non-Blocking Optical Ring Switch", Conference on Optical Fiber Communication and the National Fiber Optic Engineers, 2007, retieved at <<http://ieeexplore.ieee.org/iel5/4348297/4348298/04348315.pdf>>, Mar. 25-29, 2007, pp. 1-3.

* cited by examiner

DYNAMICALLY CONFIGURABLE SWITCH FOR DISTRIBUTED TEST LAB

BACKGROUND

Design verification testing and quality assurance testing are common test procedures used in the development of a new hardware and/or software product. These test procedures, among others, are generally successfully completed before the new product is manufactured in volume and released to market. Depending on the nature, intended use and intended market for the new product, the test procedures may test the product in a myriad of different ways and in different configurations. For example, the test procedures may functionally test the product to verify that its operating features meet the original design goals for the product. The test procedures may also functionally test the product to verify its compatibility and interoperability with other products. The test procedures may also functionally test the product to verify its compatibility with various software and hardware system environments. The test procedures may also functionally stress test the product under a variety of environmental conditions (e.g. thermal stress, electrical stress and the like) to verify its operation across a specified range of environmental conditions. The test procedures may also functionally stress test the product under different data load and system load conditions. These different types of tests may also be implemented in various combinations.

SUMMARY

This Summary is provided to introduce a selection of concepts, in a simplified form, that are further described hereafter in the Detailed Description. This Summary is not intended to identify key features or essential features of the claimed subject matter, nor is it intended to be used as an aid in determining the scope of the claimed subject matter.

Dynamically configurable switch (DCS) framework embodiments described herein generally involve a switch which is dynamically configurable via a network port on the switch. In one embodiment a DCS framework is provided in which one switch is employed to establish connections between a plurality of devices. The switch contains a plural number of upstream ports one or more of which are each coupled to a different device under test (DUT). The switch also contains a plural number of downstream ports one or more of which are each coupled to a different host device. The switch also contains a switch fabric which is dynamically configurable to establish a point-to-point electrical connection between any upstream port and any downstream port. The switch also contains a computing device which is coupled to the switch fabric and contains a network port which is coupled to the computing device. Upon receiving a command over the network port to connect a particular DUT to a particular host device, the computing device dynamically configures the switch fabric to connect the particular upstream port which is coupled to the particular DUT to the particular downstream port which is coupled to the particular host device.

In another embodiment a DCS framework is provided in which two switches are employed. A first switch containing a plural number of upstream ports resides in a first test lab. One or more DUTs also reside in the first test lab, where each DUT is coupled to a different upstream port on the first switch. The first switch is coupled to a network and is dynamically configurable to establish a logical connection between any upstream port and the network. A second switch containing a plural number of downstream ports resides in a second test lab which is located remotely from the first test lab. One or more host devices also reside in the second test lab, where each host device is coupled to a different downstream port on the second switch. The second switch is also coupled to the network and is dynamically configurable to establish a logical connection between any downstream port and the network. A test controller device is also coupled to the network, where the test controller device dynamically controls the configuration of the first and second switches by communicating with the switches over the network via a first communication protocol, where this protocol serves to establish a logical connection across the network between a particular DUT and a particular host device.

The time and resources consumed to successfully complete the aforementioned test procedures on a new product in development have a direct bearing on the cost associated with developing the product and the time it takes to release the product to market. In other words and generally speaking, the more time and resources that are needed to complete the test procedures on a new product, the larger the product development cost and the longer it will take to release the product to market. As will be appreciated from the Detailed Description of the DCS framework embodiments which follows, the DCS framework embodiments described herein provide for efficient testing of a new product in development and reduce the time and resources needed to complete the product test procedures that are necessary to confidently manufacture the product in volume and release it to market.

In addition to the just described benefits, other advantages of the DCS framework embodiments described herein will become apparent from the Detailed Description which follows hereafter when taken in conjunction with the drawing figures which accompany the Detailed Description.

DESCRIPTION OF THE DRAWINGS

The specific features, aspects, and advantages of the dynamically configurable switch (DCS) framework embodiments described herein will become better understood with regard to the following description, appended claims, and accompanying drawings where:

DETAILED DESCRIPTION

In the following description of dynamically configurable switch (DCS) framework embodiments reference is made to the accompanying drawings which form a part hereof, and in which are shown, by way of illustration, specific embodiments in which the DCS framework can be practiced. It is understood that other embodiments can be utilized and structural changes can be made without departing from the scope of the DCS framework embodiments. It is further understood that although the DCS framework embodiments are described herein in the context of testing being performed on one or more peripheral devices which are dynamically connected to one or more supporting host devices, the DCS framework embodiments are not limited to testing just the peripheral devices. Rather, the DCS framework embodiments can also be used to perform testing on the host devices, as well as on the relationship between particular peripheral devices and host devices. It is yet further understood that the DCS framework embodiments are not limited to testing just the peripheral device and host device hardware. Rather, the DCS framework embodiments can also be used to perform testing on software which is being executed on both the peripheral devices and host devices.

1.0 Conventional Test Lab

Figure 1:
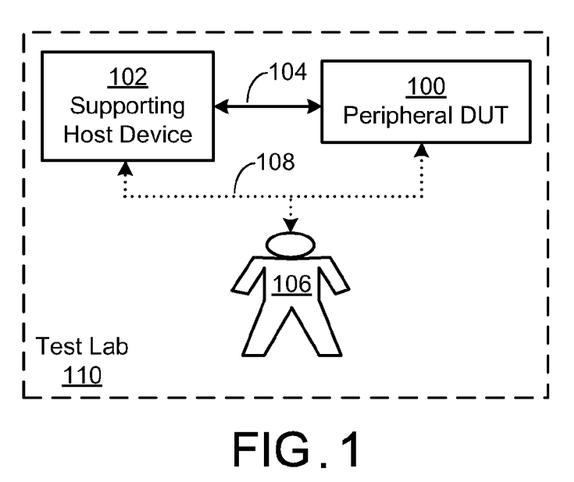
FIG. 1 is a diagram illustrating an exemplary embodiment, in simplified form, of a conventional test lab topology.

FIG. 1 illustrates an exemplary embodiment, in simplified form, of a conventional test lab topology for performing testing on a peripheral hardware device. As depicted in FIG. 1, the peripheral hardware device 100 being tested (hereafter simply referred to as a device under test (DUT)) in the test lab 110 communicates with a supporting host device 102 via a dedicated static physical connection 104. The host device 102 and the testing of the DUT 100 thereon are intended to simulate the "real-world" environment in which the DUT is expected to operate. The connection 104 is made manually by a test person 106 who is facilitating the testing in the test lab 110. The test person 106 interacts 108 with the DUT 100 and host device 102 as needed to complete the testing.

2.0 Distributed Test Lab Using Dynamically Configurable Switch

DCS framework embodiments are described in detail hereafter. The DCS framework embodiments generally involve a switch which is dynamically configurable via a network port on the switch.

2.1 Single Switch Topology

Figure 2:
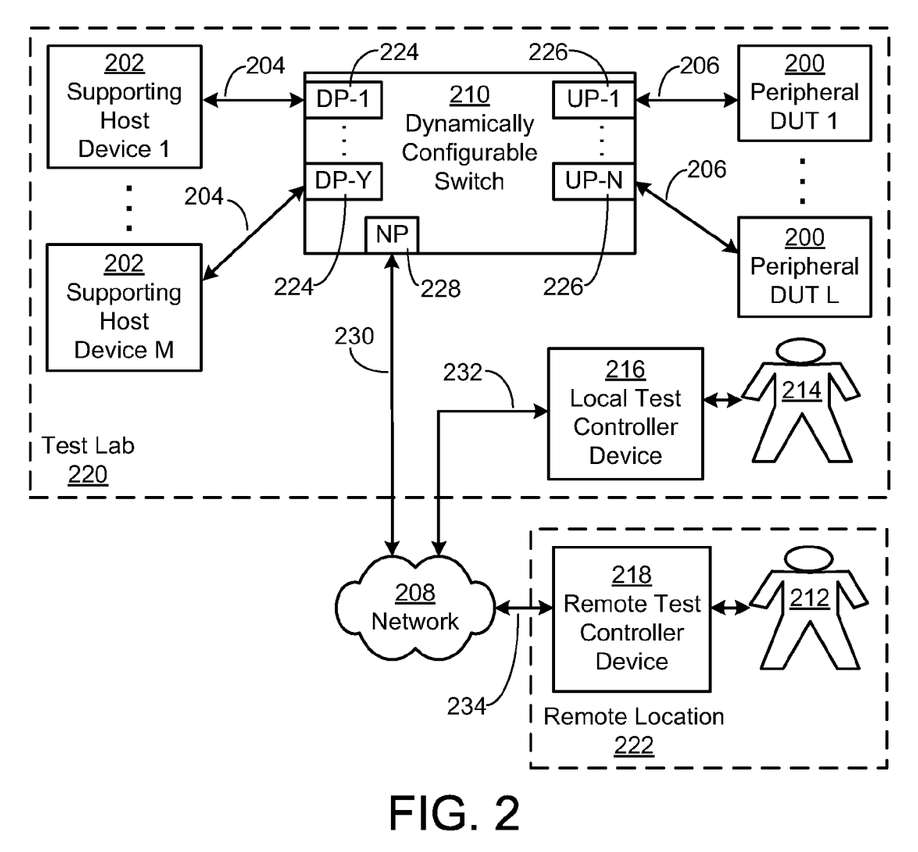
FIG. 2 is a diagram illustrating an exemplary embodiment, in simplified form, of a distributed test lab topology employing one instantiation of a dynamically configurable switch.

FIG. 2 illustrates an exemplary embodiment, in simplified form, of a distributed test lab topology employing one instantiation of a dynamically configurable switch. As depicted in FIG. 2, a test lab 220 contains a number L of DUTs such as peripheral hardware devices 200 which are being tested on a number M of supporting host devices 202 according to a prescribed test procedure. In one embodiment of the DCS framework described herein the test procedure could test a single DUT 200 (i.e., L=1) on a plurality of different host devices 202 (i.e., M>1). In another embodiment the test procedure could test a plurality of different versions of the DUT 200 (i.e., L>1) on a single host device 202 (i.e., M=1). In yet another embodiment the test procedure could test a plurality of DUTs 200 on a plurality of host devices 202 (i.e., L>1 and M>1). In this embodiment all of the DUTs 200 could be a common version, one or more of the DUTs could be different versions, or all of the DUTs could be different versions. Furthermore, in this embodiment all of the host devices 202 could be a common version, one or more of the host devices could be different versions, or all of the host devices could be different versions.

Referring again to FIG. 2, the test lab 220 also contains a dynamically configurable switch 210 which generally operates to dynamically establish a point-to-point electrical connection between any DUT 200 and any supporting host device 202. More particularly, the switch 210 contains a number N of upstream ports 226, a number Y of downstream ports 224 and a network port 228, where N≧L and Y≧M. As described hereafter, in tested embodiments of the DCS framework described herein N=Y. However, alternate embodiments of the DCS framework are also possible where N>Y or N<Y.

Referring again to FIG. 2, each upstream port 226 is coupled to a different DUT 200 via a dedicated static physical connection 206. Each downstream port 224 is coupled to a different host device 202 via a dedicated static physical connection 204. As will be described in detail hereafter, the switch 210 can dynamically establish a point-to-point electrical connection between any upstream port 226 and any downstream port 224 (i.e., the switch can dynamically establish a total of N×Y different connections). In one tested embodiment of the DCS framework described herein a 2×2 switch 210 was implemented which contained two upstream ports 226 and two downstream ports 224, and which can dynamically establish a total of four different connections. In another tested embodiment a 4×4 switch 210 was implemented which contained four upstream ports 226 and four downstream ports 224, and which can dynamically establish a total of 16 different connections. Other embodiments are also possible which employ other numbers of upstream ports 226 and downstream ports 224 such as an 8×8 switch 210 which contains eight upstream ports 226 and eight downstream ports 224, and which can dynamically establish a total of 64 different connections.

Referring again to FIG. 2, in tested embodiments of the DCS framework described herein conventional Universal Serial Bus (USB) ports were employed for both the upstream and downstream ports 226 and 224 on the dynamically configurable switch 210, a USB keyboard and a USB mouse were employed for the DUTs 200, each DUT was coupled 206 to an upstream port 226 via a wired USB connection, USB-compatible personal computers (PCs) were employed for the supporting host devices 202, and each host device was coupled 204 to a downstream port 224 via a wired USB connection. Other embodiments are also possible which employ a wide variety of other types of USB devices as the DUT 200 such as USB-compatible memory-based data storage devices, magnetic disk-based data storage devices, video game controllers, network adapters, portable audio players, mobile phones, digital still cameras, printers, scanners and the like. Yet other embodiments are also possible where functionally different types of DUTs 200 are coupled 206 to the switch 210 in a given test configuration. By way of example but not limitation, in tested embodiments both USB keyboards and USB mice were coupled 206 to a common switch 210 and were tested in common according to a prescribed test procedure.

Referring again to FIG. 2, alternate embodiments of the DCS framework described herein are also possible which employ other types of ports for the upstream and downstream ports 226 and 224 on the dynamically configurable switch 210. By way of example but not limitation, in one alternate embodiment conventional Institute of Electrical and Electronics Engineers (IEEE) 1394 ports are employed for both the upstream and downstream ports 226 and 224. In this embodiment 1394-compatible devices (such as digital video cameras, data storage devices and the like) are employed for the DUTs 200 where each DUT is coupled 206 to an upstream port 226 via a wired 1394 connection, and 1394-compatible devices (such as PCs and the like) are also employed for the supporting host devices 202 where each host device is coupled 204 to a downstream port 224 via a wired 1394 connection. In another alternate embodiment conventional External Peripheral Component Interconnect Express (External PCI-E, also known as Cabled PCI-E) ports are employed for both the upstream and downstream ports 226 and 224. In this embodiment External PCI-E-compatible devices (such as video graphics processors, data storage controllers and the like) are employed for the DUTs 200 where each DUT is coupled 206 to an upstream port 226 via a wired External PCI-E connection, and External PCI-E-compatible devices (such as PCs and the like) are employed for the supporting host devices 202 where each host device is coupled 204 to a downstream port 224 via a wired PCI-E connection. In yet another alternate embodiment conventional Ethernet ports are employed for both the upstream and downstream ports 226 and 224. In this embodiment Ethernet-compatible devices (such as printers, scanners, network communication devices, computing devices and the like) are employed for the DUTs 200 where each DUT is coupled 206 to an upstream port 226 via a wired Ethernet connection, and Ethernet-compatible devices (such as PCs and other types of computing devices) are employed for the supporting host devices 202 where each host device is coupled 204 to a downstream port 224 via a wired Ethernet connection.

Referring again to FIG. 2, the network port 228 of the dynamically configurable switch 210 is coupled to a network 208 via a communications connection 230. The network 208 provides a logical connection between the switch 210 in the test lab 220 and other devices which are coupled to the network. Examples of such other devices include, but are not limited to, the following. A local test controller device 216 can optionally reside in the test lab 220 and be coupled to the network 208 via another communications connection 232. A remote test controller device 218 can optionally reside in a remote location 222 and be coupled to the network 208 via yet another communications connection 234. It is noted that any suitable type of network 208 and related network port 228 can be employed. In tested embodiments of the DCS framework described herein the Internet was employed for the network 208, a conventional Ethernet port was employed for the network port 228, and the network port was coupled 230 to the network via a wired Ethernet connection. Other embodiments are also possible which employ other types of networks 208 such as an intranet and the like, and other types of network ports 228 and related communications connections 230 such as an RS-232 interface to a dial-up modem and the like.

Referring again to FIG. 2, another embodiment of the DCS framework described herein is possible where a plurality of remote test controller devices 218 reside in a plurality of remote locations 222. Yet another embodiment is also possible where no remote locations 222 are employed and the network 208 and test configuration are confined to the test lab 220. In this case the local test controller device 216 would be in sole control of the dynamically configurable switch's 210 configuration and would be coupled to the network port 228 either directly or via a local area network (LAN) (not shown) in the test lab 220. Yet another embodiment is also possible where no local test controller device 216 is employed in the test lab 220. In this case the remote test controller device(s) 218 would be in sole control of the switch's 210 configuration.

Generally speaking and referring again to FIG. 2, based upon input from a test person 214 into a user interface of the local test controller device 216 or input from another test person 212 into a user interface of the remote test controller device 218, the test controller device 216/218 communicates over the network 208 with the dynamically configurable switch 210 via the network port 228 in order to dynamically control the configuration of the switch. More particularly, via a first communication protocol between the test controller device 216/218 and the switch 210, the test controller device sends commands over the network 208 to the switch and receives responses over the network from the switch via the network port 228 of the switch, where the commands dynamically control the switch's configuration (e.g., which upstream port 226 is connected to which downstream port 224) and also determine the switch's current status.

Referring again to FIG. 2, one of skill in the art of product development and testing will appreciate that the DCS framework embodiments described herein provide for efficient testing of a new product in development in a variety of ways including, but not limited to, the following. Given an exemplary test configuration where eight different DUTs 200 are coupled 206 to the eight upstream ports 226 of a dynamically configurable 8×8 switch 210 and eight different supporting host devices 202 are coupled 204 to the eight downstream ports 224 of the switch, the switch can be dynamically commanded (via the aforementioned first communication protocol) to establish 64 different test configurations. In other words, a point-to-point electrical connection can be dynamically established between any of the eight DUTs 200 and any of the eight host devices 202 based upon the needs of the prescribed test procedure. Thus, DUT 200 resources and host device 202 resources are efficiently utilized since redundant DUT units and redundant host devices are not needed. Test personnel resources are also efficiently utilized since the test people 212/214 do not have to manually perform repeated static connection of DUTs 200 to host devices 202 and subsequent disconnection therefrom. As a result, the test procedure can be completed in a minimum period of time. Any need for the developers to have to replicate, distribute and track prototype DUT units 200 containing a proposed design modification is generally precluded. Additionally, the fact that a test person 212 residing in a remote location 222 can dynamically control the test configuration precludes any need for the test person to have to physically travel to the test lab 220 to manually perform their desired configuration changes, or communicate their desired changes to someone residing in the test lab and then wait for this person to manually perform the changes.

2.2 Multi-Switch Topology

Figure 3:
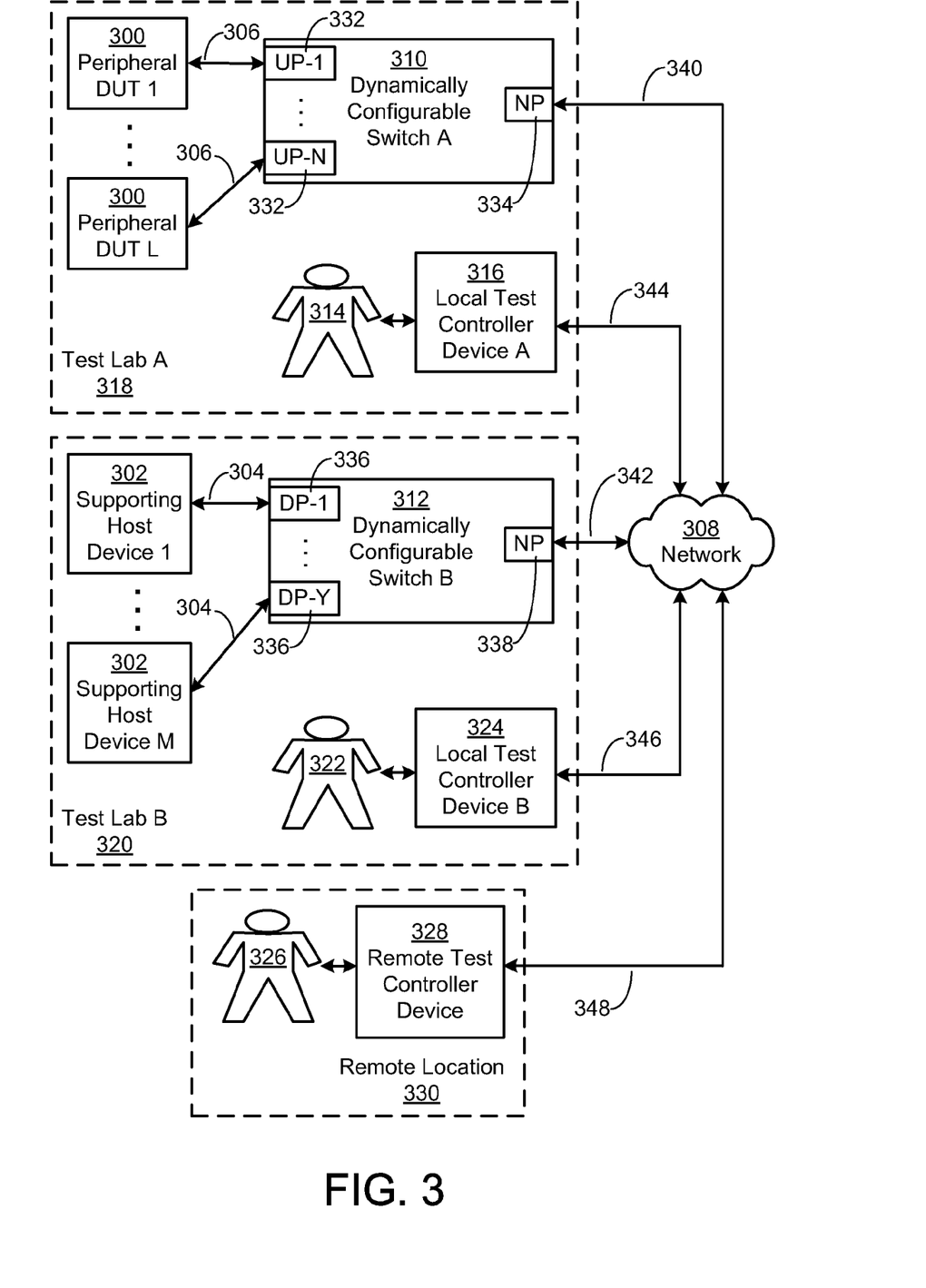
FIG. 3 is a diagram illustrating an exemplary embodiment, in simplified form, of a distributed test lab topology employing two instantiations of a dynamically configurable switch.

FIG. 3 illustrates an exemplary embodiment, in simplified form, of a distributed test lab topology employing two instantiations of the dynamically configurable switch described heretofore. As depicted in FIG. 3, a test lab A 318 contains a number L of DUTs such as peripheral hardware devices 300 and a dynamically configurable switch A 310 containing a number N of upstream ports 332 and a network port 334, where $1 \leq L \leq N$ as described heretofore. Each upstream port 332 is coupled 306 to a different DUT 300 in the manner described heretofore. The network port 334 is coupled to a network 308 via a communications connection 340 in the manner described heretofore.

Referring again to FIG. 3, a test lab B 320, which is located remotely from test lab A 318, contains a number M of supporting host devices 302 and a dynamically configurable switch B 312 containing a number Y of downstream ports 336 and a network port 338, where $1 \leq M \leq Y$ as described heretofore. Each downstream port 336 is coupled 304 to a different host device 302 in the manner described heretofore. The network port 338 is coupled to the network 308 via another communications connection 342 in the manner described heretofore.

Referring again to FIG. 3, in one embodiment of the DCS framework described herein, switch A 310 is implemented as a 2×2 switch containing two upstream ports 332 and switch B 312 is implemented as a 2×2 switch containing two downstream ports 336. In another embodiment, switch A 310 is implemented as a 4×4 switch containing four upstream ports 332 and switch B 312 is implemented as a 4×4 switch containing four downstream ports 336. Other embodiments are also possible which employ other numbers of upstream ports 332 and downstream ports 336. By way of example but not limitation, switch A 310 can be implemented as an 8×8 switch containing eight upstream ports 332 and switch B 312 can be implemented as an 8×8 switch containing eight downstream ports 336. Other embodiments are also possible where switch A 310 and switch B 312 differ in size. By way of example but not limitation, switch A 310 can be implemented as a 4×4 switch and switch B 312 can be implemented as an 8×8 switch. It is noted that all the upstream ports 332 for switch A 310 and downstream ports 336 for switch B 312 are not shown for simplicity.

Referring again to FIG. 3, the network 308 provides a logical connection between the dynamically configurable switch A 310 in test lab A 318, the dynamically configurable switch B 312, and other devices which are coupled to the network. Examples of such other devices include, but are not limited to, the following. A local test controller device A 316 can optionally reside in test lab A 318 and be coupled to the network 308 via a communications connection 344. A local test controller device B 324 can optionally reside in test lab B 320 and be coupled to the network 308 via another communications connection 346. A remote test controller device 328 can optionally reside in a remote location 330 and be coupled to the network 308 via yet another communications connection 348. Another embodiment of the DCS framework described herein is possible where a plurality of remote test controller devices 328 reside in a plurality of remote locations 330. Yet another embodiment is also possible where no remote locations 330 are employed, in which case the local test controller device A 316 and/or the local test controller device B 324 would be in control of the configuration of the switch A 310 and switch B 312. Yet another embodiment is also possible where no local test controller devices 316/324 are employed in the test labs 318/320, in which case the remote test controller device(s) 328 would be in control of the configuration of the switch A 310 and switch B 312.

Generally speaking and referring again to FIG. 3, based upon input from a test person 314 into a user interface of the local test controller device A 316, or input from another test person 322 into a user interface of the local test controller device B 324, or input from yet another test person 326 into a user interface of the remote test controller device 328, the test controller device 316/324/328 communicates over the network 308 with both the dynamically configurable switch A 310 and switch B 312 via the aforementioned first communication protocol in order to dynamically control the configuration of these switches and also determine the current status of the switches. The switches 310/312 also communicate directly with each other over the network 308 via a second communication protocol.

More particularly and referring again to FIG. 3, in order to establish a logical connection across the network 308 between a particular DUT 300 in test lab A 318 and a particular supporting host device 302 in test lab B 320, a particular test controller device 316/324/328 uses the first communication protocol to send a first command over the network to the network port 334 of switch A 310 which instructs switch A to dynamically establish a logical connection between the network port 334 and the particular upstream port 332 to which the particular DUT is coupled 306. It is noted that this logical connection can be either unidirectional or bidirectional based on the particular type of upstream port 332 employed. This first command further instructs switch A 310 to use the second communication protocol to send data traffic it receives from the particular DUT 300 via the particular upstream port 332 over the network 308 to the switch to which the particular host device 302 is coupled 304 (in this case switch B 312). This first command yet further instructs switch A 310 to use the second communication protocol to receive data traffic over the network 308 from the switch to which the particular host device 302 is coupled 304 (in this case switch B 312), and to forward this received data traffic to the particular DUT 300 via the particular upstream port 332. The particular test controller device 316/324/328 also uses the first communication protocol to send a second command over the network 308 to the network port 338 of switch B 312 which instructs switch B to dynamically establish a logical connection between the network port 338 and the particular downstream port 336 to which the particular host device 302 is coupled 304. It is noted that this logical connection can be either unidirectional or bidirectional based on the particular type of downstream port 336 employed. This second command further instructs switch B 312 to use the second communication protocol to send data traffic it receives from the particular host device 302 via the particular downstream port 336 over the network 308 to the switch to which the particular DUT 300 is coupled 306 (in this case switch A 310). This second command yet further instructs switch B 312 to use the second communication protocol to receive data traffic over the network 308 from the switch to which the particular DUT 300 is coupled 306 (in this case switch A 310), and to forward this received data traffic to the particular host device 302 via the particular downstream port 336. In this manner, any of the DUTs 300 in test lab A 318 can be tested on any of the host devices 302 in test lab B 320 according to a prescribed test procedure, where switch A 310 and switch B 312 are dynamically configured and interoperate such that the DUTs appear to be locally connected to the host devices despite the fact that the DUTs and host devices are located remotely from one another.

Referring again to FIGS. 2 and 3, alternate embodiments of the DCS framework described herein are possible in which the distributed test lab topology depicted in FIG. 3 employs more than two instantiations of the dynamically configurable switch described herein. In other words, one or more additional test labs (not shown) can be added to the topology depicted in FIG. 3, where each additional test lab is located remotely from test lab A 318 and test lab B 320. Each additional test lab would contain its own local switch (not shown) whose network port is coupled to the network in the manner described heretofore, and each additional test lab could be configured in one of the following exemplary ways. In one alternate embodiment an additional test lab could contain one or more DUTs each of which is coupled to an upstream port on the local switch (i.e., such an additional test lab would be configured like test lab A 318). In another alternate embodiment an additional test lab could contain one or more supporting host devices each of which is coupled to a downstream port on the local switch (i.e., such an additional test lab would be configured like test B 320). In yet another alternate embodiment an additional test lab could contain both one or more DUTs and one or more host devices (i.e., such an additional test lab would be configured like the test lab 220 depicted in FIG. 2). In each of these alternate embodiments the test controller device dynamically controls the configuration of the local switch in the additional test lab by communicating with this switch over the network via the first communication protocol described herein. As necessary, this switch also communicates over the network directly with other remote switches in the topology via the second communication protocol described herein. Thus, in the aforementioned alternate embodiment where an additional test lab contains both DUTs and host devices, a logical connection can be established across the network between any DUT residing in the additional test lab and any host device remotely residing in another test lab. A logical connection can also be established across the network between any host device residing in the additional test lab and any DUT remotely residing in another test lab. An electrical connection can also be established between any DUT residing in the additional test lab and any host device also residing in the additional test lab.

One of skill in the art of product development and testing will appreciated that the DCS framework embodiments described in this section provide for efficient testing of a new product in development in a variety of additional ways besides those which have been described heretofore. By way of example but not limitation, since a common test lab can be dynamically shared between a plurality of test people who are located remotely from one another, different development teams (e.g., hardware development, firmware development, driver software development, application software development, and the like) can perform their own specialized testing of a particular DUT on a particular supporting host device without having to physically transport the DUT and host device from one test lab, to the next, and so on, and without having to produce redundant DUTs or procure redundant host devices. Additionally, since a particular DUT and a particular host device do not have to be physically co-located in the same test lab in order for the DUT to be tested on the host device, any time and expense associated with having to physically transport either the DUT or host device so that they are co-located is eliminated.

2.3 Servo Unit

Figure 7:
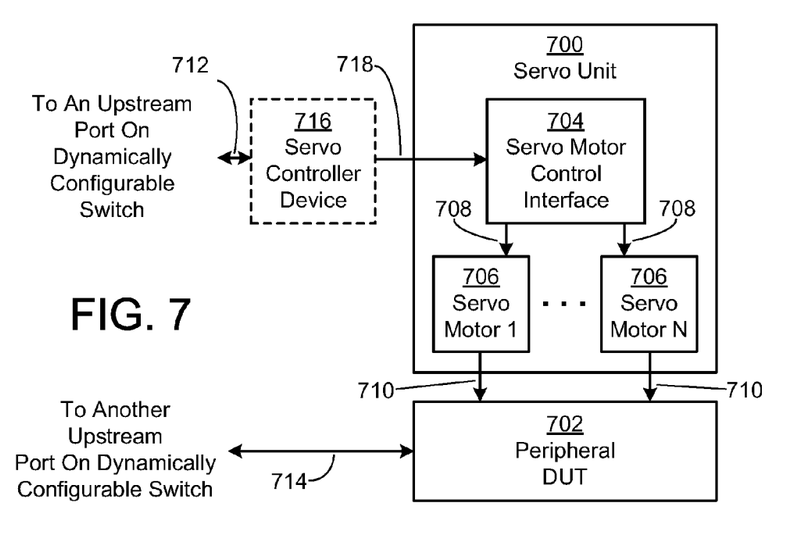
FIG. 7 is a diagram illustrating an exemplary embodiment, in simplified form, of a servo unit which can be optionally used with a dynamically configurable switch.

FIG. 7 illustrates an exemplary embodiment, in simplified form, of a servo unit which can be optionally employed in the DCS framework described herein. More particularly and as depicted in FIG. 7, one or more servo units 700 can be optionally employed in a test lab containing one or more DUTs 702 to which mechanical action must be applied in order to complete the DUT testing in real-world operating scenarios. Each servo unit 700 contains a servo motor control interface module 704 and one or more conventional electrical servo motors 706. The interface module 704 is electrically coupled 708 to each servo motor 706. The interface module 704 is also coupled 712/718 to an upstream port on a dynamically configurable switch in the test lab in the manner described heretofore. Each servo motor 706 is mechanically coupled 710 to a particular DUT 702 in the test lab, where the DUT is coupled 714 to another upstream port on the switch. The switch can support a plurality of servo units 700. In tested embodiments of the DCS framework described herein, the interface module 704 supported up to three servo motors 706. However, alternate embodiments are possible in which a larger number of servo motors 706 could be supported. An external power source (not shown) can optionally be coupled to the interface module 704 in the event that the particular servo motor(s) 706 which are coupled 708 to the interface module exceed a prescribed power level.

Referring again to FIG. 7, the switch sends a series of servo motor control commands to each servo motor control interface module 704 coupled to the switch, where these commands control the mechanical actions performed by each servo motor 706 coupled to the interface module. Whenever the interface module 704 receives such a command, it sends the appropriate signals 708 to the servo motors 706 which result in the motors performing a mechanical action(s) on the DUT 702 coupled 710 to the motors. In this manner, the servo motors 706 perform an automated series of prescribed mechanical actions on the DUT 702 coupled thereto. The particular nature of each servo unit's 700 mechanical actions is tailored to the needs of the particular DUT 702 which is coupled thereto and the needs of the prescribed test procedure which is being implemented to test the DUT. Exemplary mechanical actions include pressing buttons on a keyboard, moving a joystick, pressing a power on/off switch and the like. As such, each servo unit 700 facilitates automated testing of such a DUT 702 by eliminating the need for a test person to have to manually interact with the DUT to complete the testing. Furthermore, the need for a test person to have to be present in the test lab during the DUT 702 testing is eliminated. It is also noted that the mechanical design of the servo unit 700 is flexible so that it can be modified to support different mechanical action schemes on different types of DUTs 702 using different types of electrical-mechanical devices, such as linear motors and the like.

2.4 Switch Hardware

Figure 4:
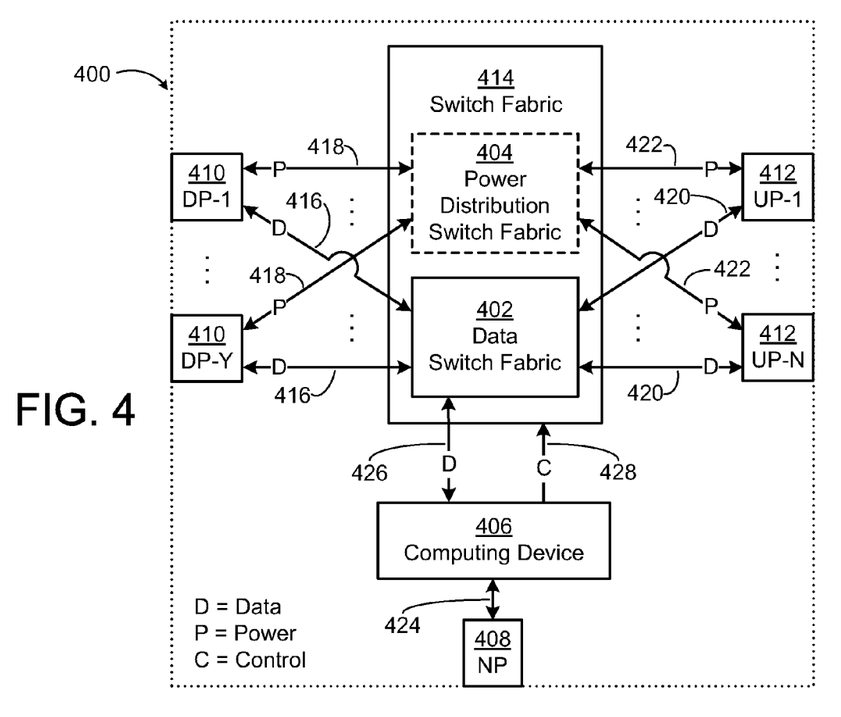
FIG. 4 is a diagram illustrating an exemplary embodiment, in simplified form, of a hardware implementation for a dynamically configurable switch.

FIG. 4 illustrates an exemplary embodiment, in simplified form, of a hardware implementation for the dynamically configurable switch. As depicted in FIG. 4, the switch hardware 400 contains a number N of upstream port connectors 412, a number Y of downstream port connectors 410, a network port connector 408, a computing device 406 and a switch fabric module 414. In tested embodiments of the DCS framework described herein, a conventional microcontroller was employed as the computing device 406. However, alternate embodiments are possible which employ any of the variety of other computing devices described hereafter.

Referring again to FIG. 4, the switch fabric module 414 contains a data switch fabric unit 402 which is coupled to a group of downstream data signals 416 emanating from each of the downstream port connectors 410, where these signals 416 carry data traffic to and from a device which may be coupled to these connectors 410. The data switch fabric unit 402 is also coupled to a group of upstream data signals 420 emanating from each of the upstream port connectors 412, where these signals 420 carry data traffic to and from a device which may be coupled to these connectors 412. The data switch fabric unit 402 is dynamically configurable and operates to electrically connect (in a point-to-point manner) the upstream data signals 420 emanating from any upstream port connector 412 to the downstream data signals 416 emanating from any downstream port connector 410. It is noted that this electrical connection can be either unidirectional or bidirectional based on the particular type of port 410/412 that is employed.

Referring again to FIG. 4 and as described heretofore, a variety of types of ports can be employed for the upstream ports 412 and downstream ports 410 of the switch 400. In the case where a particular type of port is employed that contains one or more power signals in addition to data signals (e.g., the aforementioned USB port type), the switch fabric module 414 will also contain a power distribution switch fabric unit 404 which will be coupled to the downstream power signal(s) 418 emanating from each of the downstream port connectors 410 and will also be coupled to the upstream power signal(s) 422 emanating from each of the upstream port connectors 412. The optional power distribution switch fabric unit 404 is dynamically configurable and operates to electrically connect (in a point-to-point manner) the upstream power signal(s) 422 emanating from any upstream port connector 412 to the downstream power signal(s) 418 emanating from any downstream port connector 410.

Referring again to FIGS. 4 and 7, the computing device 406 generates a group of control signals 428 which are coupled to the switch fabric module 414. The control signals 428 dynamically control the configuration of the data switch fabric unit 402 and the optional power distribution switch fabric unit 404 in tandem. In other words, whenever the switch 400 contains both the data switch fabric unit 402 and the power distribution switch fabric unit 404, the configuration of the two switch units 402/404 is controlled in tandem such that the upstream data signals 420 and power signal(s) 422 emanating from a particular upstream port connector 412 are connected as a pair to the downstream data signals 416 and power signal(s) 418 emanating from a particular downstream port connector 410. The computing device 406 is also coupled to the network port 408. A data channel 426 also exists between the data switch fabric unit 402 and the computing device 406. The data channel 426 provides the computing device 406 with access to the upstream data signals 420 emanating from each of the upstream port connectors 412 and access to the downstream data signals 416 emanating from each of the downstream port connectors 410. The data channel 426 is used by the computing device 406 to establish the aforementioned logical connection between the network port 408 and any of the upstream ports 412 or downstream ports 410. In the case where a servo unit 700 is coupled to a particular upstream port 412 on the switch 400, the computing device 406 would also use the data channel 426 to send servo motor control commands to the servo unit via the particular upstream port's 412 data signals 420, where these commands serve to dynamically control the mechanical actions of the servo motors 706 contained in the servo unit.

Referring again to FIG. 4, all commands and data traffic received by the switch 400 over the network (not shown) via the network port 408 are processed as needed by the computing device 406. In other words, the computing device 406 generally controls the operation of the switch 400 based on commands and data traffic it receives from either a test controller device or another switch. By way of example but not limitation, in the case where the switch 400 receives a command to establish a point-to-point electrical connection between a device (not shown) which is coupled to a particular upstream port 412 and another device (not shown) which is coupled to a particular downstream port 410, the computing device 406 will generate the control signals 428 necessary to configure the switch fabric 414 to establish the connection between the particular upstream and downstream ports. In the case where the switch 400 receives a command to establish a logical connection across the network between a local device (not shown) which is coupled to an upstream or downstream port 412/410 on the switch (note that the first device could be coupled to any of the upstream 412 or downstream 410 ports) and a remote device (not shown) which is coupled to a remote switch (not shown), the computing device 406 will operate as follows. Data traffic sent from the local device to the switch 400 via the upstream/downstream port 412/410 will be received over the data channel 426 by the computing device 406 and will be sent by the computing device over the network via the network port 408 to the remote switch. Data traffic received over the network from the remote switch will be received by the computing device 406 via the network port 408 and will be sent by the computing device over the data channel 426 to the local device via the appropriate upstream/downstream port 412/410.

2.5 Switch Software

Figure 5:
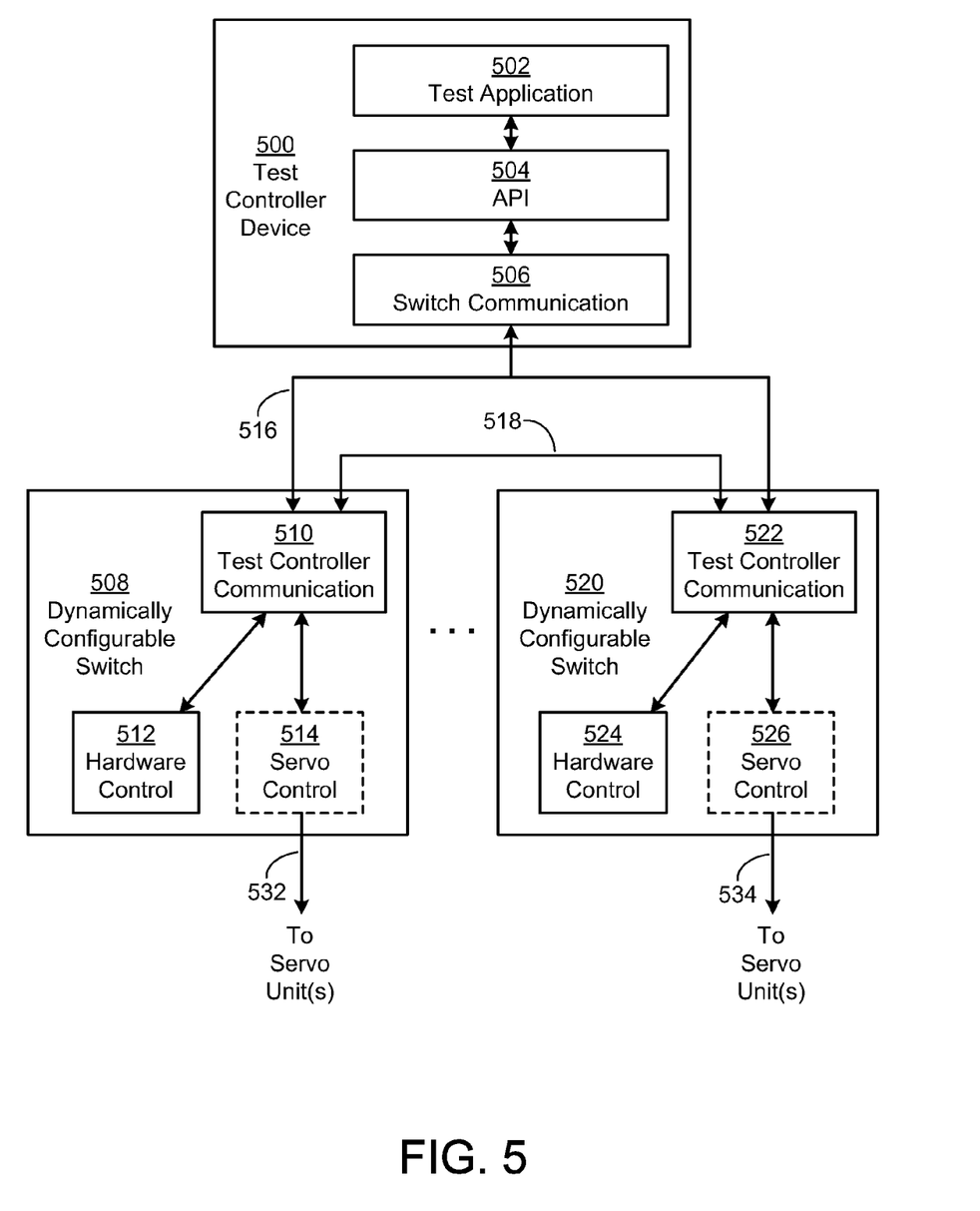
FIG. 5 is a diagram illustrating an exemplary embodiment, in simplified form, of a software implementation for a dynamically configurable switch.

FIG. 5 illustrates an exemplary embodiment, in simplified form, of a software implementation for the dynamically configurable switch. As described heretofore, and as depicted in FIG. 5 and referring again to FIGS. 4 and 7, a test lab topology employs one or more test controller devices 500, one or more dynamically configurable switches 508/520, and can optionally employ one or more servo units 700. Each test controller device 500 executes a test application module 502, an application programming interface (API) module 504 and a switch communication module 506. The computing device 406 of each switch 508/520 executes a test controller communication module 510/522, a hardware control module 512/524 and an optional servo control module 514/526. The hardware control module 512/524 controls the configuration and determines the current status of all of the hardware in the switch 508/520 including the switch fabric module 414. The servo control module 514/526 dynamically controls the mechanical actions of the one or more servo motors 706 contained in any servo units 700 which are coupled 712/718 to upstream ports 412 on the switch 508/520.

Referring again to FIGS. 5 and 7, each test controller device 500 generally operates to control each switch 508/520 and servo unit 700 in a coordinated manner according to a prescribed test procedure. More particularly, based upon input from a test person into the user interface of the test controller device 500, the test application module 502 communicates with the switch communication module 506 via the API module 504 in order to send commands to each switch 508/520, where these commands generally control the switch's configuration, determine its current status, and control any servo units 700 which may be coupled to the switch. The switch communication module 506 sends the commands to the appropriate switch 508/520 and receives status responses therefrom via a first communication protocol 516. The test controller communication module 510/522 of the appropriate switch 508/520 receives commands from the test controller device 500 and communicates with the hardware control module 512/524 and servo control module 514/526 as necessary to complete the operation indicated by the received commands.

Referring again to FIGS. 4, 5 and 7, whenever the switch 508/520 receives a command from the test controller device 500 via the first communication protocol 516 which necessitates that the switch sends a response to the test controller device, the test controller communication module 510/522 sends the response to the test controller device via the first communication protocol. The test controller communication module 510 of a first switch 508 also communicates directly with the test controller communication module 522 of a second switch 520 via a second communication protocol 518 in order to bidirectionally transfer data traffic between a first device which is coupled to a port 410/412 on the first switch and a second device which is coupled to a port 410/412 on the second switch. Whenever the switch 508/520 receives a servo unit control command from the test controller device 500 via the first communication protocol 516 which necessitates that a new mechanical action be performed by a servo unit 700 coupled to the switch, the servo control module 514/526 sends one or more servo motor control commands to the servo unit via a third communication protocol 532/534. In this manner the servo motors 706 contained in the servo unit 700 can be precisely controlled to perform a series of mechanical actions on the DUT 702 coupled thereto (such as pressing a sequence of buttons on a keyboard and the like) and these actions can be coordinated with dynamic changes to the switch's 508/520 configuration according to a prescribed test procedure.

3.0 Additional Embodiments

While the DCS framework has been described in detail by specific reference to embodiments thereof, it is understood that variations and modifications thereof can be made without departing from the true spirit and scope of the DCS framework. By way of example but not limitation and referring again to FIGS. 5 and 7, the servo control module 514/526 described heretofore can be implemented in a separate servo controller device 716 residing outside the dynamically configurable switch 508/520. In this case, the servo controller device 716 could control a plurality of servo units 700.

By way of further example, one or more servo units can be optionally employed in a test lab containing one or more host devices to which mechanical action must be applied in order to complete the host device and/or DUT testing in real-world operating scenarios. In this case the servo motor control interface module of each servo unit would be coupled to a downstream port on a dynamically configurable switch in the test lab in the manner described heretofore. The one or more servo motors contained in each servo unit would be mechanically coupled to a particular host device in the test lab, where the host device is coupled to another downstream port on the switch. The switch would send a series of servo motor control commands to each servo motor control interface module coupled to the switch, where these commands control the mechanical actions performed by each servo motor coupled to the interface module. Whenever the interface module receives such a command, it would send the appropriate signals to the servo motors which result in the motors performing one or more mechanical actions on the host device coupled to the motors. In this manner, the servo motors could perform an automated series of prescribed mechanical actions on the host device coupled thereto. The particular nature of each servo unit's mechanical actions would be tailored to the needs of the particular host device which is coupled thereto and the needs of the prescribed test procedure which is being implemented to test the host device and/or the DUT which is coupled to the host device.

It is also noted that any or all of the aforementioned embodiments can be used in any combination desired to form additional hybrid embodiments. Although the DCS framework embodiments have been described in language specific to structural features and/or methodological acts, it is to be understood that the subject matter defined in the appended claims is not necessarily limited to the specific features or acts described heretofore. Rather, the specific features and acts described heretofore are disclosed as example forms of implementing the claims.

4.0 Computing Environment

This section provides a brief, general description of a suitable computing system environment in which portions of the DCS framework embodiments described herein can be implemented. These DCS framework embodiments are operational with numerous general purpose or special purpose computing system environments or configurations. Exemplary well known computing systems, environments, and/or configurations that can be suitable include, but are not limited to, personal computers (PCs), server computers, hand-held or laptop devices, multiprocessor systems, microprocessor-based systems, set top boxes, programmable consumer electronics, network PCs, minicomputers, mainframe computers, distributed computing environments that include any of the aforementioned systems or devices, and the like.

Figure 6:
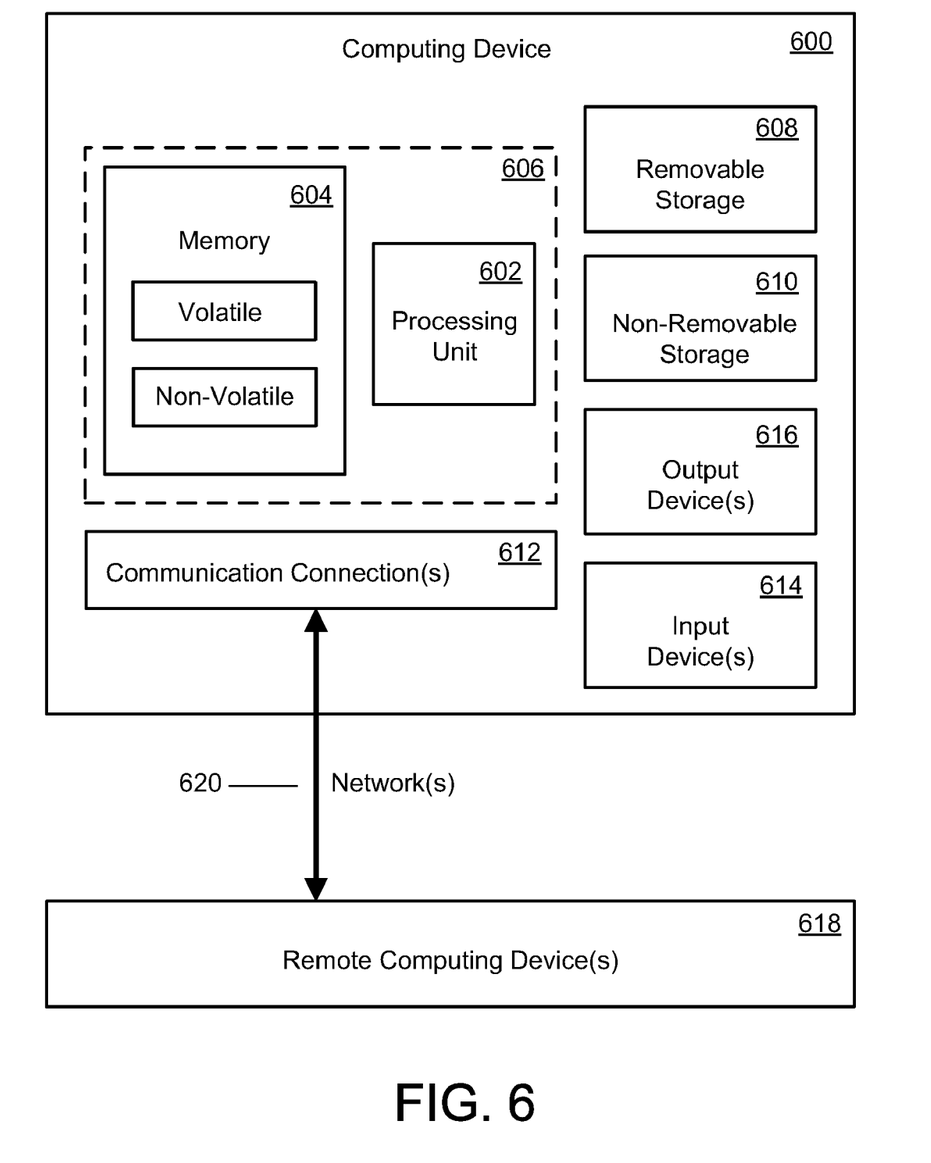
FIG. 6 is a diagram illustrating an exemplary embodiment, in simplified form, of a general purpose, network-based computing device which constitutes an exemplary system for implementing portions of the DCS framework embodiments described herein.

FIG. 6 illustrates an exemplary embodiment, in simplified form, of a suitable computing system environment according to the DCS framework embodiments described herein. The environment illustrated in FIG. 6 is only one example of a suitable computing system environment and is not intended to suggest any limitation as to the scope of use or functionality of the DCS framework embodiments described herein. Neither should the computing system environment be interpreted as having any dependency or requirement relating to any one or combination of components exemplified in FIG. 6.

As exemplified in FIG. 6, an exemplary system for implementing portions of the DCS framework embodiments described herein includes one or more computing devices, such as computing device 600. In its simplest configuration, computing device 600 typically includes at least one processing unit 602 and memory 604. Depending on the specific configuration and type of computing device, the memory 604 can be volatile (such as RAM), non-volatile (such as ROM and flash memory, among others) or some combination of the two. This simplest configuration is illustrated by dashed line 606.

As exemplified in FIG. 6, computing device 600 can also have additional features and functionality. By way of example, computing device 600 can include additional storage such as removable storage 608 and/or non-removable storage 610. This additional storage includes, but is not limited to, magnetic disks, optical disks and tape. Computer storage media typically embodies volatile and non-volatile media, as well as removable and non-removable media implemented in any method or technology. The computer storage media provides for storage of various information needed to operate the device 600 such as computer readable instructions associated with an operating system, application programs and other program modules, and data structures, among other things. Memory 604, removable storage 608 and non-removable storage 610 are all examples of computer storage media. Computer storage media includes, but is not limited to, RAM, ROM, EEPROM, flash memory or other memory technology, CD-ROM, digital versatile disks (DVD) or other optical disk storage technology, magnetic cassettes, magnetic tape, magnetic disk storage or other magnetic storage devices, or any other medium which can be used to store the desired information and which can be accessed by computing device 600. Any such computer storage media can be part of computing device 600.

As exemplified in FIG. 6, computing device 600 also includes a communications connection(s) 612 that allows the device to operate in a networked environment and communicate with a remote computing device(s), such as remote computing device(s) 618. Remote computing device(s) 618 can be a PC, a server, a router, a peer device, or other common network node, and typically includes many or all of the elements described herein relative to computing device 600. Communication between computing devices takes place over a network(s) 620, which provides a logical connection(s) between the computing devices. The logical connection(s) can include one or more different types of networks including, but not limited to, a local area network(s) (LAN) and wide area network(s) (WAN). Such networking environments are commonplace in conventional offices, enterprise-wide computer networks, intranets and the Internet. It will be appreciated that the communications connection(s) 612 and related network(s) 620 described herein are exemplary and other means of establishing communication between the computing devices can be used.

As exemplified in FIG. 6, communications connection(s) 612 and related network(s) 620 are an example of communication media. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, but not limitation, communication media includes wired media such as a wired network or direct-wired connection, and wireless media such as acoustic, radio frequency (RF), infrared, frequency modulation (FM) radio and other wireless media. The term "computer-readable medium" as used herein includes both the aforementioned storage media and communication media.

As exemplified in FIG. 6, computing device 600 also includes an input device(s) 614 and output device(s) 616. Exemplary input devices 614 include, but are not limited to, a keyboard, mouse, pen, touch input device, microphone, and camera, among others. A user can enter commands and various types of information into the computing device 600 through the input device(s) 614. Exemplary output devices 616 include, but are not limited to, a display device(s), a printer, and audio output devices, among others. These input and output devices are well known and need not be described at length here.

Referring again to FIG. 6, the DCS framework embodiments described herein can be further described in the general context of computer-executable instructions, such as program modules, which are executed by computing device 600. Generally, program modules include routines, programs, objects, components, and data structures, among other things, that perform particular tasks or implement particular abstract data types. The DCS framework embodiments can also be practiced in a distributed computing environment where tasks are performed by one or more remote computing devices 618 that are linked through a communications network 612/620. In a distributed computing environment, program modules can be located in both local and remote computer storage media including, but not limited to, memory 604 and storage devices 608/610.

Wherefore, what is claimed is:

1. A physical, dynamically configurable switch for establishing connections between a plurality of devices, comprising:
    a plural number N of upstream ports;
    a plural number Y of downstream ports;
    a data switch fabric which is coupled to a group of upstream data signals emanating from each upstream port, said upstream data signals carrying data traffic to and from the devices under test coupled to the upstream ports, and which is coupled to a group of downstream data signals emanating from each downstream port, said downstream data signals carrying data traffic to and from host devices coupled to the downstream ports, and wherein the data switch fabric is dynamically configurable to establish a point-to-point electrical connection between the upstream data signals emanating from any upstream port and the downstream data signals emanating from any downstream port;
    a computing device coupled to the data switch fabric; and
    a network port coupled to the computing device, wherein,
        one or more of the upstream ports are each coupled to a different device under test (DUT),
        one or more of the downstream ports are each coupled to a different host device, and
        upon receiving a command over the network port to connect a particular DUT to a particular host device, the computing device dynamically configures the data switch fabric to connect the particular upstream port which is coupled to the particular DUT to the particular downstream port which is coupled to the particular host device.

2. The dynamically configurable switch of claim 1, wherein,
    one or more of the upstream ports are each coupled to a different servo unit, wherein,
        each servo unit comprises a servo motor control interface and one or more servo motors, and
        each servo motor is electrically coupled to the servo motor control interface and mechanically coupled to a particular DUT, and
    the coupling between the computing device and the switch fabric comprises a data channel between the data switch fabric and the computing device, wherein,
        the data channel provides the computing device with access to the upstream data signals emanating from each upstream port and access to the downstream data signals emanating from each downstream port, and
        the data channel is used by the computing device to send servo motor control commands to the servo motor control interface of each servo unit, said commands serving to dynamically control each servo unit's servo motors in order to perform an automated series of prescribed mechanical actions on the particular DUT coupled to said motors.

3. The dynamically configurable switch of claim 1, wherein,
    the switch fabric further comprises a power distribution switch fabric,
    the power distribution switch fabric is coupled to one or more upstream power signals emanating from each upstream port and one or more downstream power signals emanating from each downstream port, and
    the power distribution switch fabric is dynamically configurable to establish a point-to-point electrical connection between the upstream power signals emanating from any upstream port and the downstream power signals emanating from any downstream port, said dynamic configuration operating in tandem with the dynamic configuration of the data switch fabric such that the upstream data signals and power signals emanating from a particular upstream port are connected as a pair to the downstream data signals and power signals emanating from a particular downstream port.

4. The dynamically configurable switch of claim 1, wherein the upstream ports and downstream ports comprise Universal Serial Bus (USB) ports.

5. The dynamically configurable switch of claim 4, wherein,
    each DUT comprises one of a USB-compatible keyboard, mouse, memory-based data storage device, magnetic disk-based data storage device, video game controller, wireless network adapter, portable audio player, mobile phone, digital still camera, printer, or scanner, and
    each host device comprises a USB-compatible personal computer.

6. The dynamically configurable switch of claim 1, wherein the upstream ports and downstream ports comprise Institute of Electrical and Electronics Engineers (IEEE) 1394 ports.

7. The dynamically configurable switch of claim 6, wherein,
    each DUT comprises one of an IEEE 1394-compatible digital video camera or data storage device, and
    each host device comprises an IEEE 1394-compatible personal computer.

8. The dynamically configurable switch of claim 1, wherein the upstream ports and downstream ports comprise External Peripheral Component Interconnect Express (PCI-E) ports.

9. The dynamically configurable switch of claim 8, wherein,
- each DUT comprises one of an External PCI-E-compatible video graphics processor or data storage controller, and
- each host device comprises an External PCI-E-compatible personal computer.

10. The dynamically configurable switch of claim 1, wherein the upstream ports and downstream ports comprise Ethernet ports.

11. The dynamically configurable switch of claim 10, wherein,
- each DUT comprises one of an Ethernet-compatible printer, scanner, network communication device or computing device, and
- each host device comprises an Ethernet-compatible personal computer or other type of computing device.

12. The dynamically configurable switch of claim 1, wherein the network port comprises an Ethernet port.

13. The dynamically configurable switch of claim 1, wherein either,
- the plural number N of upstream ports is greater than the plural number Y of downstream ports, or
- the plural number N of upstream ports is less than the plural number Y of downstream ports.

* * * * *